United States Patent [19]

Anada et al.

[11] Patent Number: 5,251,983
[45] Date of Patent: Oct. 12, 1993

[54] LINEAR MOTION ROLLING GUIDE UNIT

[75] Inventors: Katsuya Anada; Yasumasa Ooya, both of Gifu, Japan

[73] Assignee: Nippon Thompson Co., Ltd., Tokyo, Japan

[21] Appl. No.: 10,865

[22] Filed: Jan. 29, 1993

[30] Foreign Application Priority Data

Jan. 31, 1992 [JP] Japan ............................ 4-040719

[51] Int. Cl.$^5$ .............................................. F16C 29/06
[52] U.S. Cl. ........................................ 384/45; 384/44
[58] Field of Search ........................ 384/43, 44, 45; 464/168

[56] References Cited

U.S. PATENT DOCUMENTS

| 4,902,143 | 2/1990 | Morita | 384/45 X |
| 4,932,067 | 6/1990 | Pester et al. | 384/45 |
| 4,983,049 | 1/1991 | Lecomte | 384/45 |
| 5,082,374 | 1/1992 | Narumiya | 384/45 |
| 5,129,736 | 7/1992 | Tanaka | 384/45 |

FOREIGN PATENT DOCUMENTS 1-175564  7/1989  Japan .
4-63812   5/1992  Japan .

Primary Examiner—Thomas R. Hannon
Attorney, Agent, or Firm—Browdy and Neimark

[57] ABSTRACT

The linear motion rolling guide unit has: a track rail; a casing slidable relative to the track rail and having a pair of raceway surfaces; end caps mounted to the casing; V-shaped grooves formed between the raceway surfaces of the casing; a retainer having an engagement projecting portion engaged in the V-shaped groove; and a number of rollers circulating in contact with the facing raceway surfaces. The overall length of the retainer is set larger than that of the casing, and the ends of the retainer are engaged in the engagement grooves in the end caps to position the end caps with respect to the casing. Therefore, the positioning of the end caps on the casing can be made accurately without being affected by heat-treatment-induced deformation and machining errors.

6 Claims, 2 Drawing Sheets

LINEAR MOTION ROLLING GUIDE UNIT

BACKGROUND OF THE INVENTION

1. Field of the Invention

The present invention relates to a linear motion rolling guide unit which is applied to sliding portions of machining tools and various processing equipment and which consists of a track rail with raceway grooves formed longitudinally extending on both side walls thereof, a casing saddling the track rail and having raceway grooves, and a number of rolling elements that roll between the facing raceway grooves.

2. Description of the Prior Art

In a conventional linear motion rolling guide unit, a slider that slides on a track rail consists of a casing, end caps fixed to both ends of the casing, end seals attached to the end caps, and an under seal provided to the underside of the slider. The linear motion rolling guide unit further consists of: a number of rolling elements that travel rolling in a raceway formed between the raceway groove on the track rail and the raceway surface on the casing; and a retainer fixed to the casing to hold the rolling elements in the casing.

As an example of such a linear motion rolling guide unit, there is a four-raceway endless linear motion rolling guide unit. The four-raceway endless linear motion rolling guide unit will be explained by referring to FIGS. 2, 3 and 4. FIG. 2 is an example perspective view of the four-raceway linear motion rolling guide unit. FIG. 3 is an end view of the four-raceway endless linear motion rolling guide unit of FIG. 2. FIG. 4 is a cross section taken along the line A—A of FIG. 2.

The four-raceway endless linear motion rolling guide unit has a track rail 1 with almost and I-shaped cross section, a slider 2 saddling the track rail 1 in such a way that it can move relative to or slide on the track rail 1, and a number of cylindrical rolls 3 rotatably interposed between the track rail 1 and the slider 2. The track rail 1 is formed with recessed grooves 8 longitudinally extending on both sides 18 thereof, which form raceway surfaces 5, 6. The recessed grooves 8 of the track rail 1 are formed at the upper and lower edges with a longitudinally extending upper raceway surface 5 and lower raceway surface 6 formed on slant surfaces. The slider 2 has a casing 4 which is formed with the recessed portion 10 so that the casing can saddle the track rail 1, and end caps 7 attached to both longitudinal ends of the casing 4. To seal the boundary between the track rail 1 and the slider 2 when the slider 2 slides on the track rail 1, the ends of the end caps 7 are each provided with an end seal 20 and the underside of the slider 2 with an under seal 22.

The recessed portion 10 of the casing 4 is formed with a longitudinally extending upper raceway surface 11 and lower raceway surface 12 at locations facing the upper raceway surface 5 and the lower raceway surface 6 of the track rail 1. Between the upper raceway surface 11 and the lower raceway surface 12 of the casing 4 is formed a longitudinally extending engagement V-shaped groove 15, which engages with an engagement projection 16 formed on the retainer 9 which extends longitudinally. A part of the retainer 9 is loosely fitted in the recessed groove 8 of the track rail 1 and screwed and fixed by bolts 17 inserted through the bolt insertion hole 26 formed in the casing 4.

In the above construction of the 4-raceway endless linear motion rolling guide unit, two raceways are formed on each side of the track rail 1, one by the upper raceway surface 5 on the track rail 1 and the upper raceway surface 11 on the casing 4 and the other by the lower raceway surface 6 on the track rail 1 and the lower raceway surface 12 on the casing 4. Hence, a total of four raceways are formed on both sides of the track rail 1. In these loaded roller raceways, a number of cylindrical rollers 3 roll in contact with the facing raceway surfaces 5 and 11, 6 and 12. The casing 4 is formed with return passages 13, 14, and the end caps 7 are formed with direction changing passages (not shown), that connect the loaded roller raceways and the return passages 13, 14. Hence, two endless circulating passages are formed by the loaded roller raceways, the direction changing passages and the return passages 13, 14.

The endless circulating passages may, for example, have different lengths and be disposed one inside the other. That is, a smaller endless circulating passage may be arranged inside the loop of a larger endless circulating passage and disposed at right angles with each other so that they will not interfere with each other. The larger and smaller endless passages have the same length of the loaded roller raceways. As the slider 2 moves along the track rail 1,, the cylindrical rollers 3 circulate through the large and small endless circulating passages. It is also possible to make the endless circulating passages cross each other so that they can be formed in the same length.

Such a four-raceway endless linear motion rolling guide unit is cited, for example, in the Japanese Patent Laid-Open No. 175564/1989, Japanese Utility Model Laid-Open No. 63812/1992, and Japanese Patent Application No. 166326/1991.

In the conventional four-raceway endless linear motion rolling guide unit, the process of mounting the end caps 7 on the casing 4 consists of: positioning the end caps on the casing 4 precisely; forming two endless circulating passages by the loaded roller passages, the direction changing passages and the return passages 13, 14 to allow for smooth circulation of rollers 3; and forming an appropriate sliding surface at the boundary between the track rail 1 and the slider 2.

In the conventional four-raceway endless linear motion rolling guide unit, the end caps 7 are mounted to the casing 4 generally by forming positioning holes in the casing 4 and then positioning the end caps 7 with respect to the casing 4. However, since the heat-treatment of the casing 4 and the end cap 7 causes their deformation and since the casing 4 and end caps 7 are subject to the machining process, the precise positioning of the end caps 7 with respect to the casing 4 cannot be made even if the casing 4 is formed with the positioning holes.

SUMMARY OF THE INVENTION

A primary object of this invention is to solve the above-mentioned problems and to provide a linear motion rolling guide unit which, by utilizing a retainer that holds a large number of rollers, can make a precise end cap positioning on the casing with respect to the retainer, can precisely form two endless circulating passages by the loaded roller raceways, the direction changing passages and the return passages to allow for smooth circulation of the rollers, and can effectively seal the gap between the track rail and the slider.

In a linear motion rolling guide unit, which consists of: a track rail having raceway surfaces formed longitudinally extending on both side walls thereof; a casing slidable relative to the rail and having a pair of raceway surfaces formed therein at positions facing the track rail raceway surfaces; end caps attached to the longitudinal ends of the casing; longitudinal V-shaped grooves formed between the raceway surfaces of the casing; retainers having a longitudinally extending engagement projecting portion that engages with the V-shaped groove; and a number of rolling elements trapped in and circulating through the raceway formed between the facing raceway surfaces; the linear motion rolling guide unit is characterized in that the overall length of the retainer is set greater than that of the casing and that the ends of the retainer are engaged with the end caps to position the end caps with respect to the casing, thereby making it possible to perform precise and easy positioning of the end caps on the casing with reference to the retainer that holds a number of rollers.

In this linear motion rolling guide unit, the engagement grooves in the casing are formed into V-shaped grooves located between the raceway surfaces that are cut simultaneously with the V-shaped grooves, and the engagement projecting portion of the retainer is engaged with the V-shaped groove to secure the retainer to the casing. Hence, with the retainer taken as the reference for positioning, the ends of the retainer are engaged in the positioning grooves or holes in the end caps, which are then secured to the casing. This permits the end caps to be precisely positioned on the casing—the casing which has four loaded roller raceways, two on each side of the track rail. With the end caps correctly positioned on the casing, the under seal and the end seals are attached to the end caps or the casing to provide a good seal for the gap between the track rail and the slider.

Therefore, with this linear motion rolling guide unit, it is possible to form with ease and precision the two endless circulating passages that consist of: the loaded roller raceways defined by the casing and the track rail; the direction changing passages formed in the end caps; and the return passages formed in the casing. In this guide unit, a large number of rollers can be smoothly circulated in the endless circulating passages and the under seal can keep in a good sealing condition the gap between the track rail and the slider made up of the casing and the end caps.

DETAILED DESCRIPTION OF EMBODIMENTS

Figure 1:
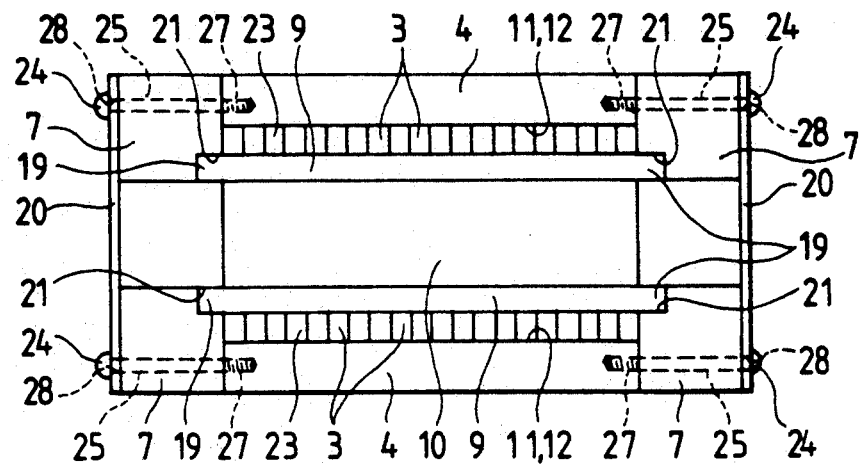
FIG. 1 is a bottom view showing one embodiment of the linear motion rolling guide unit of this invention, with the track rail not shown.

Now, by referring to FIG. 1, the linear motion rolling guide unit according to this invention will be described. The linear motion rolling guide unit of this invention is basically the same in construction as the four-raceway endless linear motion rolling guide unit of FIGS. 2, 3, and 4 and is characterized in the mounting of the retainer 9 and the end cap 7. That is, the linear motion rolling guide unit consists of: a track rail 1 having recessed portions 8 that are formed with an upper raceway surface 5 and a lower raceway surface 6 extending longitudinally on both side walls 18 in the same manner as shown in FIG. 2; and a slider 2 that strides on the track rail 1 and is slidable relative to the rail 1. The slider 2 is slidable relative to the track rail 1 and has a casing 4, which is formed with an upper raceway surface 11 at a position facing the upper raceway surface 5 and also with a lower raceway surface 12 at a position facing the lower raceway surface 6. The slider 2 also has end caps 7 attached to the longitudinal ends of the casing 4; engagement V-shaped grooves 15 that are formed between the raceway surfaces 11, 12; engagement projecting portions 16 that engage with the V-shaped grooves 15; retainers 9 that have rolling element support surfaces 29 extending from the engagement portions 16; and a large number of cylindrical rollers 3, the rolling elements that circulate in contact with the facing raceway surfaces 5, 11 and another pair of facing raceway surfaces 6, 12. The V-shaped groove 15 of the casing 4, the engagement projecting portion 16 of the retainer 9, and the rolling element support surface 29 extend longitudinally so that the sides of the cylindrical rollers 3 traveling between the upper and lower raceway surfaces 5, 6, 11, 12 of the track rail 1 and the casing 4 are supported by the rolling element support surfaces 29 to prevent the cylindrical rollers 3 from coming off.

In this linear motion rolling guide unit, the ends of the end caps 7 attached to the longitudinal ends of the casing 4 are provided with end seals 20, though not shown, and the undersides of the casing 4 and the end caps 7 are fitted with under seals 22. The end caps 7 are arranged at both ends of the casing 4. The end caps 7 are each formed with a plurality of bolt insertion holes 25 and the end seal 20 with bolt insertion holes 25. The casing 4 is formed with threaded holes 27 at positions corresponding to the bolt insertion holes 25. Therefore, the bolts 24 are passed through the bolt insertion holes 25 of the end seal 20 and the end cap 7 and then screwed into the threaded holes 27 in the casing 4, thus fixing the end cap 7 and the end seal 20 to the casing 4. The inside of the end cap 7 is formed with direction changing passages on both sides for changing the direction in which the rollers 3 run in the raceways between the casing 4 and the track rail 1.

Figure 2:
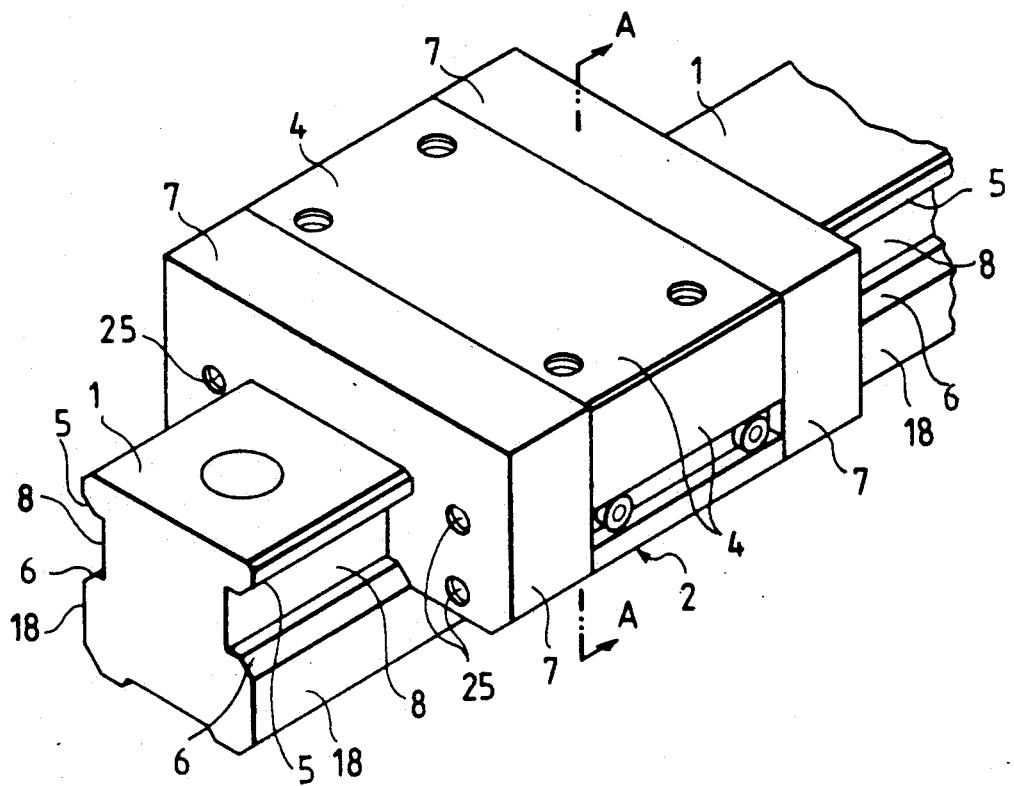
FIG. 2 is a perspective view of one embodiment of the four-raceway endless linear motion rolling guide unit in which the linear motion rolling guide unit of this invention can be incorporated.
Figure 3:
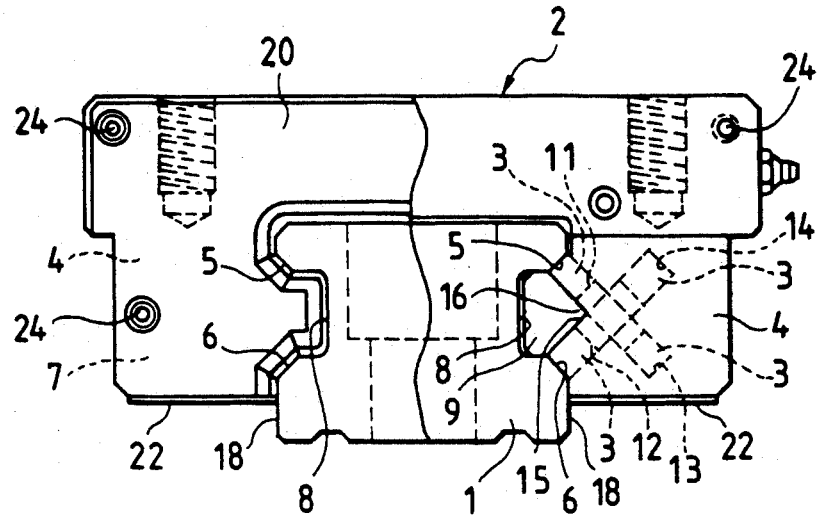
FIG. 3 is an end view of the four-raceway endless linear motion rolling guide unit of FIG. 2.
Figure 4:
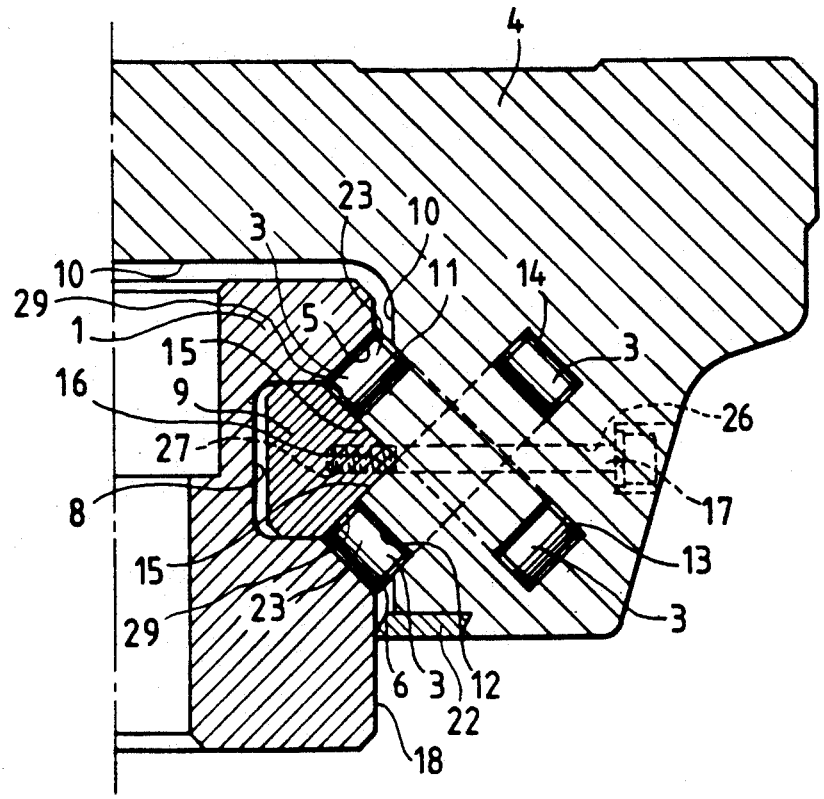
FIG. 4 is a cross section taken along the line A—A of FIG. 2.

The linear motion rolling guide unit, as shown in FIG. 1 in particular, is characterized in that the end cap 7, when it is mounted to the casing 4, is positioned with respect to casing 4 by the retainer 9—which is fixed to the casing 4 by bolt 17 for preventing the rollers 3 from coming off. In FIG. 1, parts that have the same functions as those of FIGS. 2, 3 and 4 are given the like reference numerals.

In this linear motion rolling guide unit, the overall length of the retainer 9 is made larger than that of the casing 4 so that it is suitable for positioning the end caps 7 onto the casing 4. The end caps 7 are formed with the positioning grooves 21 in which the ends 19 of the retainer 9 are fitted. With the end surfaces of the end caps 7 placed in contact with the end surfaces of the casing 4, the ends 19 of the retainer 9 are engaged in the engagement grooves 21 such as positioning grooves or holes in the end caps 7.

The casing 4 has raceway surfaces 11, 12 and V-shaped grooves 15 formed by cutting at the same time. The V-shaped grooves 15 constitute engagement grooves for the retainer 9 between the raceway surfaces 11 and 12. That is, with the engagement projecting portion 16 of the retainer 9 fitted in the V-shaped groove 15 of the casing 4, the retainer 9 is secured to the casing 4 by bolts 17.

In this linear motion rolling guide unit, the retainer 9 is correctly positioned on the casing 4 and secured to the V-shaped groove 15, which was cut simultaneously with the raceway surfaces 11, 12, in order to position the end cap 7 with reference to the retainer 9. This permits the end cap 7 to be precisely positioned with respect to the casing 4. As a result, it is possible to form with precision the endless circulating passage which is defined by the loaded roller raceway 23 formed by the track rail 1 and the casing 4, the direction changing passage formed in the end cap 7, and the return passages 13, 14 formed in the casing 4. This allows smooth circulation of the rollers 3 in the endless circulating path and also ensures a good seal between the track rail 1 and the slider 2. Therefore, it is possible to perform the positioning of the end caps 7 on the casing 4 with precision and ease, without being affected by the heat-treatment deformation and the machining errors.

Since the linear motion rolling guide unit is constructed as described above, the casing 4, the end caps 7 and the retainer 9 can be assembled as follows. The cylindrical rollers 3 are arranged on the raceway surfaces 11, 12 of the casing 4. With the engagement projecting portion 16 of the retainer 9 set at a specified position in the V-shaped groove 15 of the casing 4, the bolt 17 is inserted into the bolt insertion hole 26 from outside the casing 4, and screwed into the threaded hole 27 of the retainer 9 to fix the retainer 9 to the casing 4. With the retainer 9 secured to the casing 4, the end surfaces of the end caps 7 are placed in contact with the end surfaces of the casing 4. And the ends 19 of the retainer 9 are engaged in the positioning grooves 21 in the end caps 7 to position the end caps 7 with respect to the casing 4. Next, the end seals 20 are put in contact with the end surfaces of the end caps 7. Bolts 24 are passed through the bolt insertion holes 28 extending from the end seal 20 to the casing 4 and through the bolt insertion holes 25 formed in the end caps 7. They are then screwed into the threaded holes 27 in the casing 4 to secure the end seals 20 and the end caps 7 to the casing 4.

What is claimed is:

1. In a linear motion rolling guide unit which consists of:
   a track rail having a pair of upper and lower raceway surfaces formed longitudinally extending on each side wall thereof;
   a casing saddling the track rail and being able to slide relative to the track rail, the casing having a pair of upper and lower raceway surfaces formed therein at positions facing the rail raceway surfaces, the casing having a V-shaped groove formed between the upper and lower raceway surfaces;
   end caps mounted to each longitudinal end of the casing;
   raceways formed between the upper and lower raceway surfaces of the casing and the rail raceway surfaces of the track rail;
   a number of rolling elements rolling and circulating through the raceways; and
   a retainer secured to the casing and having an engagement projecting portion and rolling element support surfaces extending from the engagement projecting portion, the engagement projecting portion being adapted to engage with the V-shaped groove in the casing, the rolling element support surfaces holding the rolling elements in such a way as to prevent them from coming off the raceways with the retainer secured to the casing;
   the linear motion rolling guide unit characterized in that:
   the retainer is formed to have a predetermined overall length greater than that of the casing;
   the end surfaces of the end caps on the casing side are formed with engagement grooves with which the ends of the retainer engage;
   the engagement grooves are formed at such positions that the end caps can be set at a specified position on the casing; and
   the ends of the retainer are engaged in the engagement grooves in the end caps to position the end caps with respect to the casing.

2. A linear motion rolling guide unit as claimed in claim 1, wherein the V-shaped groove from in the casing can be cut simultaneously with the upper and lower raceway surfaces formed in the casing and the retainer is secured to the casing with the engagement projecting portion of the retainer engaged with the V-shaped groove.

3. A linear motion rolling guide unit as claimed in claim 1, wherein the V-shaped groove formed in the casing extends in the longitudinal direction of the casing and the engagement projecting portion of the retainer extends in the longitudinal direction of the retainer.

4. A linear motion rolling guide unit as claimed in claim 1, wherein the rolling elements are formed as cylindrical rollers.

5. In a linear motion rolling guide unit which consists of:
   a track rail having a pair of upper and lower raceway surfaces formed longitudinally extending on each side wall thereof;
   a casing saddling the track rail and being able to slide relative to the track rail, the casing having a pair of upper and lower raceway surfaces formed therein at positions facing the rail raceway surfaces, the casing having a V-shaped groove formed between the upper and lower raceway surfaces;
   end caps mounted to each longitudinal end of the casing;
   raceways formed between the upper and lower raceway surfaces of the casing and the rail raceway surfaces of the track rail;
   a number of rolling elements rolling and circulating through the raceways;
   a retainer secured to the casing and having an engagement projecting portion and rolling element support surfaces extending from the engagement projecting portion, the engagement projecting portion being adapted to engage with the V-shaped groove in the casing, the retainer's rolling element support surfaces holding the rolling elements in such a way as to prevent them from coming off the raceways with the retainer secured to the casing;
   end seals placed on the end surfaces of the end caps on the side opposite to the casing to seal the gap between the track rail and the end caps;
   threaded holes formed in the retainer;
   bolts inserted through bolt insertion holes formed in the casing; and under seals attached to the undersides of the casing and the end caps to seal the gap between the casing and the end caps;

the linear motion rolling guide unit characterized in that:

the retainer is formed to have a predetermined overall length greater than that of the casing;

the end surfaces of the end caps on the casing side are formed with engagement grooves with which the ends of the retainer engage;

the engagement grooves are formed at such positions that the end caps can be set at a specified position on the casing;

the ends of the retainer are engaged in the engagement grooves in the end caps to position the end caps with respect to the casing; and wherein the retainer is positioned on the casing, the bolts are passed through the bolt insertion holes in the casing and screwed into the threaded holes in the retainer to secure the retainer to the casing.

6. In a linear motion rolling guide unit which consists of:

a track rail having a pair of upper and lower raceway surfaces formed longitudinally extending on each side wall thereof;

a casing saddling the track rail and being able to slide relative to the track rail, the casing having a pair of upper and lower raceway surfaces formed therein at positions facing the rail raceway surfaces, the casing having a V-shaped groove formed between the upper and lower raceway surfaces;

end caps mounted to each longitudinal end of the casing;

raceways formed between the upper and lower raceway surfaces of the casing and the rail raceway surfaces of the track rail;

a number of rolling elements rolling and circulating through the raceways;

end seals placed on the end surfaces of the end caps on the side opposite to the casing to seal the gap between track rail and the end caps; a retainers secured to the casing and having an engagement projecting portion and rolling element support surfaces extending from the engagement projecting portion, the engagement projecting portion being adapted to engage with the V-shaped groove in the casing, the rolling element support surfaces holding the rolling elements in such a way as to prevent them from coming off the raceways with the retainer secured to the casing; and bolts inserted through bolt insertion holes formed in the end seals and the end caps;

the linear motion rolling guide unit characterized in that:

the retainer is formed to have a predetermined overall length greater than that of the casing;

the end surfaces of the end caps on the casing side are formed with engagement grooves with which the ends of the retainer engage;

the engagement grooves are formed at such positions that the end caps can be set at a specified position on the casing;

the ends of the retainer are engaged in the engagement grooves in the end caps to position the end caps with respect to the casing; and wherein the retainer is positioned on the casing, the longitudinal end surfaces of the casing are provided with the end caps and the end seals, the bolts are inserted through the bolt insertion holes in the end seals and the end caps and screwed into the threaded holes in the casing to secure the end caps and the end seals to the casing.

* * * * *